United States Patent

[11] 3,578,915

[72] Inventors Yves H. Le Goffic
Pavillon 3, Saint-Roch, Lannion;
Maurice F. Le Dorh, 34 rue Branly, Perros-Guirec; Fernand R. Arnouat, Pen an Ru, Lannion, France

[21] Appl. No. 834,798
[22] Filed June 19, 1969
[45] Patented May 18, 1971
[32] Priority June 21, 1968
[33] France
[31] 156,176

[54] TELEPHONE SWITCHING SYSTEM EMPLOYING TIME DIVISION AND DELTA-MODULATION
3 Claims, 9 Drawing Figs.

[52] U.S. Cl. 179/15BY, 179/15AP, 179/18FF
[51] Int. Cl. H04m 3/24
[50] Field of Search 179/15 (AL), 15 (AT), 15 (AP), 15 (AC), 2 (DP); 178/50; 307/265, 267

[56] References Cited

UNITED STATES PATENTS

| | | | |
|---|---|---|---|
| 3,060,325 | 10/1962 | Vinal | 307/267 |
| 3,461,244 | 8/1969 | Brolin | 179/15(AL) |
| 3,470,482 | 9/1969 | Kolnowski | 307/265 |
| 3,491,206 | 1/1970 | Sheridan | 179/15(APC) |
| 3,496,301 | 2/1970 | Kaenel | 179/15(AT) |

*Primary Examiner*—Kathleen H. Claffy
*Assistant Examiner*—David L. Stewart
*Attorney*—Abraham A. Saffitz

ABSTRACT: Telephone switching system employing delta-modulation which comprises a time-division switching network, a plurality of subscriber's telephone sets and, in the switching network, an equal plurality of subscriber's equipments connected to the subscriber's sets by four-wire subscriber's lines. Each subscriber's set comprises a delta-modulator for converting the analog signals produced by the telephone set into delta-coded pulses, a delta demodulator for converting delta-coded pulses coming from said switching network into analog signals applied to the telephone set, a timer and means for synchronizing said timer by said delta demodulator. The switching network comprises a timer defining sampling periods. Each subscriber's equipment comprises means for receiving delta-coded signals from the telephone subscriber's sets, a pulse converter and stretcher converting each delta-coded pulse received from a subscriber's set into a long pulse of the same binary value, having a duration equal to one sampling period and coincident with the full sampling period just following said delta-coded pulse occurrence time, means for sampling said long pulse during the time slots allocated to the subscribers and comprised within said sampling period, and means for transmitting delta-coded signals to said telephone subscriber's sets.

Patented May 18, 1971 3,578,915

6 Sheets-Sheet 1

INVENTORS:
Yves H. LE GOFFIC,
Maurice F. LE DORH,
Fernand R. ARNOUAT
By Abraham A. Saffitz
ATTORNEY INVENTORS:
Yves H. LE GOFFIC,
Maurice F. LE DORH,
Fernand R. ARNOUAT
By Abraham A. Saffitz
ATTORNEY Patented May 18, 1971 3,578,915

6 Sheets-Sheet 3

INVENTORS:
Yves H. LE GOFFIC,
Maurice F. LE DORH,
Fernand R. ARNOUAT
By Abraham A. Saffitz
ATTORNEY INVENTORS:
Yves H. LE GOFFIC,
Maurice F. LE DORH,
Fernand R. ARNOUAT
By Abraham A. Saffitz
ATTORNEY INVENTORS:
Yves H. LE GOFFIC, Maurice F. LE DORH,
Fernand R. ARNOUAT
By Abraham A. Saffitz
ATTORNEY INVENTORS:
Yves H. LE GOFFIC,
Maurice F. LE DORH,
Fernand R. ARNOUAT
By Abraham A. Saffitz
ATTORNEY

TELEPHONE SWITCHING SYSTEM EMPLOYING TIME DIVISION AND DELTA-MODULATION

The present invention relates to a telephone switching system employing delta modulation and in particular to a telephone switching system of this type employing time division, in which the delta modulators and demodulators are situated within the subscribers' telephone sets.

Delta modulation is a well-known technique in which instead of repeatedly converting the amplitudes of an analog signal into a binary code form, the mean slope of the signal (amplitude variation during the sampling period) between recurrent instants is coded. This kind of modulation has two main advantages. Each sample of slope, and not of amplitude, is coded into a single code element per sampling period. A sequence of pulses alternately equal to one and to nought, and not a sequence of zero pulses, corresponds to an analog zero voltage. If the code pulses are thus applied to establish a timing synchronization this synchronization may occur even during periods of silence.

Telephone switching systems employing delta-modulation and time division have already been suggested. OSAMU ENOMOTO, ATSUSHI TOMOZAWA, HITOSHI KATAYAMA, HISASHI KANETO and TADAHIRO SEKIMOTO have described a switch or selector of this nature in the Japanese periodical "NEC Research and development" No. 8, Oct. 1966, pages 126 to 133. In this article the connection from a subscriber to the exchange is established by means of two pairs of wires, one for transmission and the other for reception, which do not transmit coded signals, but analog signals. The items of delta-modulation equipment allocated to each subscriber are situated in the automatic selector mechanism. The delta coding of the voice signal and the decoding of the coded signal are thus performed in the automatic selector mechanism under dependence on the timer of the latter. The connections between subscribers are made by applying the principle of chronological division of the sampling period.

It is an object of this invention to provide an improved telephone switching system and delta modulation.

According to this invention there is provided a telephone switching system employing time division and delta modulation wherein each subscriber's set comprises a delta modulation coder and decoder, a timer and means for synchronizing the timer by means of the delta modulated signals received by the subscriber's set and wherein the exchange comprises a timer, a plurality of subscribers' equipments, each subscribers' equipment comprising a "sampler" and a pulse stretcher circuit for converting each pulse of the delta-modulated signals transmitted by the subscriber's set into a long pulse of the same binary value and having a duration equal to the sampling period of the exchange timer so that this long pulse may be sampled during the time slot allocated to the subscriber and comprised within the sampling period.

Preferably the code pulses transmitted by the subscriber are pulses having a definite guard interval between successive pulses of value one or nought and are at the frequency of the subscriber's timer which is lower than the frequency of the exchange timer, and wherein the exchange comprises means to correlate each code pulse from the subscriber with an internally generated brief pulse which, under allowance for the distortion and jitter caused by transmission and by possible lack of synchronization between the subscriber's timer and the exchange timer, occupies a variable position within the sampling period of the exchange, the pulse converter serving to convert this brief pulse of variable position into a long pulse having a predetermined duration and instant of occurrence.

This long pulse resulting from the conversion and whereof the duration is the sampling period $\pi$ is then sampled within the time slot allocated to the subscriber.

Preferably the successive sampling periods of the exchange are denoted by A, $\bar{A}$, A, $\bar{A}$ ....., then, in use, if the brief pulse derived from the subscriber's code pulse falls within the period A, the converter normally correlates the same with a long pulse occupying the entire duration of the period $\bar{A}$ and if the brief pulse derived from the subscriber's code pulse falls within the period $\bar{A}$, the converter normally correlates the same with a long pulse occupying the entire duration of the period A.

Since the period of the subscriber's timer is longer than the period of the exchange timer, the result is that in the absence of synchronization, the brief pulses derived from the subscriber's code pulses are displaced from the one period to the other. Measures are preferably taken to ensure that this displacement does not exceed a sampling semiperiod, or more commonly, a predetermined fraction of a sampling period. It may occur that the measures taken to limit the displacement remain inoperative, for example if the subscriber called, whose coded modulation synchronizes the timer of the calling subscriber, speaks so loudly that the time taken by the delta modulation to join the analogical modulation exceeds a predetermined value. During a conversation, it may thus occur that the brief pulse derived from the subscriber's code pulse falls within the first or the second semiperiod of the sampling period. If it falls within the first semiperiod of A or of $\bar{A}$, whilst continuing to be displaced from cycle to cycle, it will finally coincide with the middle of the period, but having at least half a period of possible displacement available before it until the end of the period, which displacement value cannot be reached, it is unnecessary to take any special measure. If the brief pulse falls within the second semiperiod of A of of $\bar{A}$, whilst continuing to be displaced from cycle to cycle, it will finally coincide with the end of the period and pass beyond this period. It will thus encroach on the long pulse A or $\bar{A}$ which it should have engendered, and will in point of fact engender a long pulse displaced by a sampling period with respect to the required long pulse so that a sampling error will be the result. A special measure is preferably taken in such case. Instead of the pulse resulting from the brief pulse being A or $\bar{A}$, depending on whether this brief pulse fell within $\bar{A}$ or A, the resulting pulse becomes B or $\bar{B}$ depending on whether the brief pulse fell within $\bar{A}$ or A, B and $\bar{B}$ being pulse displaced through a semiperiod relative to A and $\bar{A}$, respectively.

The detailed operation of a preferred telephone switching system in accordance with this invention will now be given; this differs somewhat from that already specified, since A and B are processed symmetrically.

The result of the process described is that, during operation, one of the long pulses which follow one another at the sampling frequency can be displaced by a semiperiod; all those which follow the displaced one are then equally displaced through a semiperiod. A long pulse of a duration of $1.5\tau$ is thus in existence. Since the sampling slots of the subscribers are tied to the sampling period and are not displaced through a semiperiod when the long pulse is displaced through a semiperiod when the long pulse is displaced through a semiperiod, i.e. is stretched by half its own duration, it may occur according to the corresponding phase of the subscriber's sampling slot and to the onset of the sampling period, that the pulse having the duration $1.5\tau$ may be sampled twice; an erroneous sample will thus intervene, but the sequence of the other samples will be precise.

The automatic selector mechanism does not form part of the invention. Its function is simply to effect appropriate switching of the delta-modulated code pulses generated by the pulse converters. The structure of such an automatic selector mechanism is relatively uncomplicated. Reduced to its essential elements, it may be considered as being formed by sets of gates opening and closing at strictly defined instants to establish or suppress the "itineraries" allocated to the coded conversation signals.

The pulses flowing in the switching network are brief pulses separated by guard intervals which are much longer than the pulses and almost equal to the sampling period, whilst the pulses employed between the exchange and the subscriber are pulses of square wave shape. The subscriber's equipment, in addition to the transmission pulse converter whose function has been specified, comprises a retransmission pulse converter which performs the required change in wave form. The delta-modulated signals dispatched to the subscriber are in phase with the exchange timer, so that the subscriber's timer may by synchronized, using these.

If a connection between first and second subscriber's sets is considered in the direction from the first to the second, the preceding considerations demonstrate that the first subscriber transmits pulses in phase with the timer contained within his set. This timer is synchronized by the pulses transmitted by the set of the second subscriber, which after transit through the automatic selector mechanism of the exchange, are in phase with the exchange timer. The pulses originating from the first subscriber's set reach the exchange with a phase which depends on the length of the line and on the period between two successive synchronizations of the timer of this subscriber. The pulse converter, situated at the exchange, renders it possible to process the pulses from the first subscriber for correct reconstitution and appropriate passage through the automatic selector mechanism of these. On issuing from the latter, the said pulses in phase with the exchange timer, are directed through the retransmission pulse converter towards the reception line of the second subscriber, for action after being formed to shape, on the decoder and the timer of the set of this second subscriber.

An embodiment of this invention will now be described by way of example only, with reference to the accompanying drawings, in which:

FIG. 1, in the form of a block diagram, illustrates a telephone switching system employing delta-modulation in which the delta modulators and demodulators are situated in the telephone sets;

Figure 1:
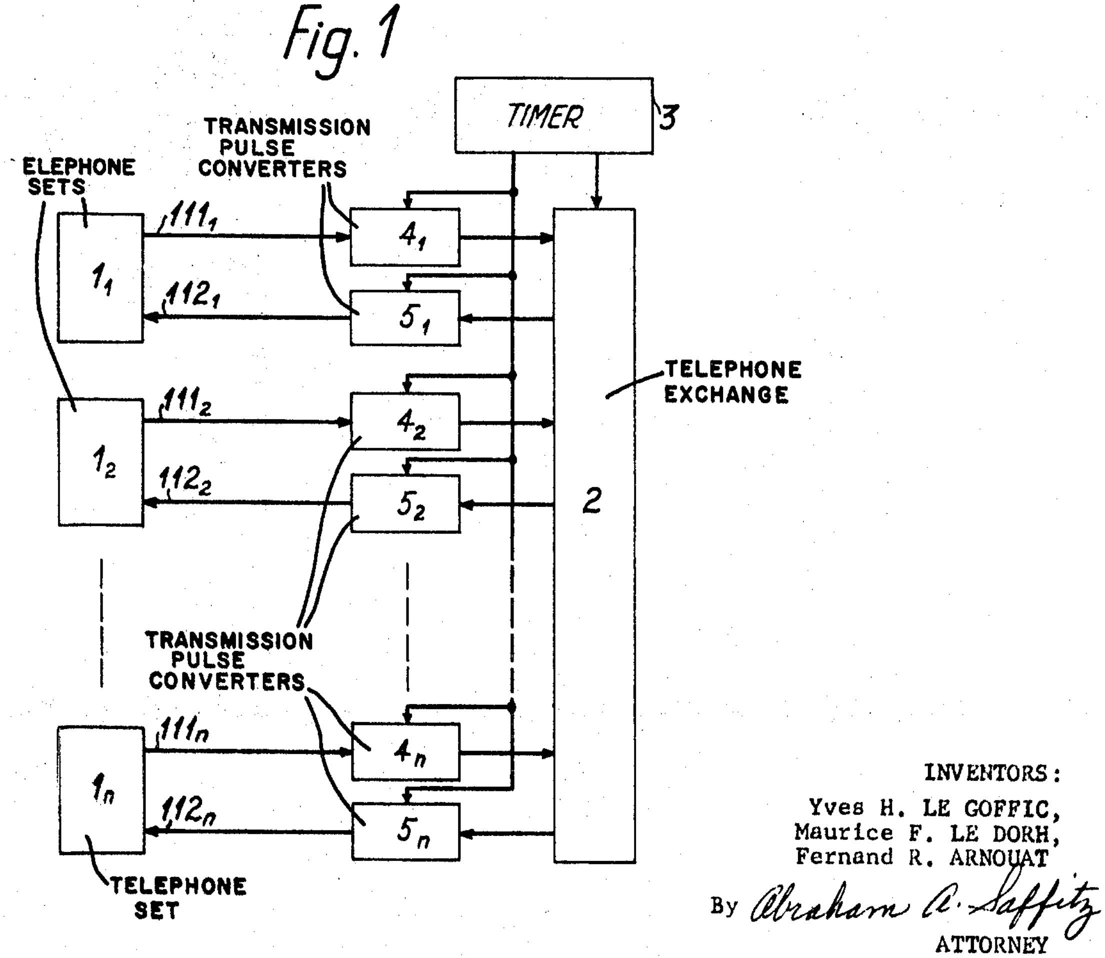

FIG. 1 illustrates a telephone exchange 2 which renders it possible to interconnect the telephone sets $1_1$, $1_2$.....$1_n$ of the type having two lines per set, corresponding lines $111_1$, $111_2$.....$111_n$ being used for transmission, and the others $112_1$, $112_2$.....$112_n$ being used for reception. Between the telephone sets and the exchange are interpolated subscriber's equipment appliances containing pulse converters. Half of these items of equipment $4_1$ to $4_n$ are as many identical transmission pulse converter circuits as there are subscriber's; these circuits receive delta-modulated pulses submitted to drift, and convert these into pulses having predetermined durations and phases. The other half of the items of equipment $5_1$ to $5_n$ are as many identical retransmission pulse converter circuits as there are subscriber's; these circuits effect the conversion and retransmission of the signals from the calling subscriber's to the called subscriber's. The transmission conversion devices $4_1$ to $4_n$, the retransmission conversion devices $5_1$ to $5_n$, and the automatic selector mechanism 2 are positively controlled by a time base 3.

Figure 2:
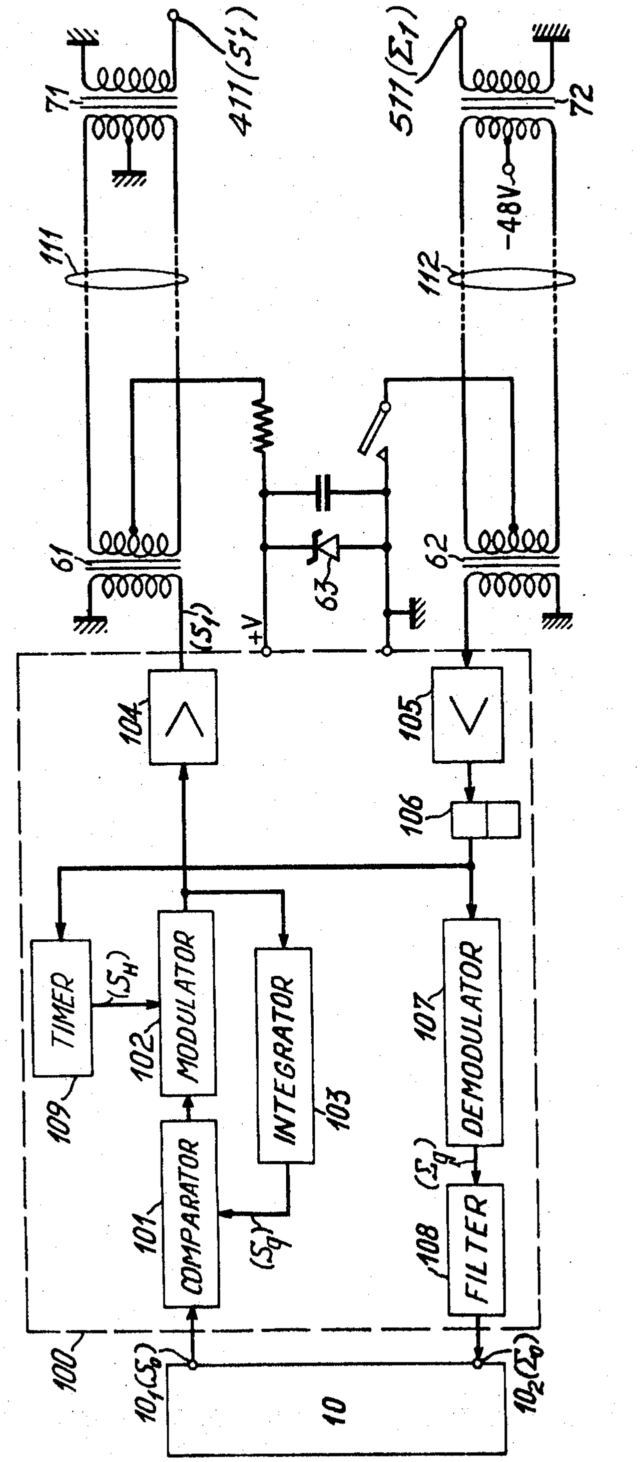
FIG. 2 illustrates the circuit diagram of a subscriber's telephone set containing a delta modem.
Figure 3:
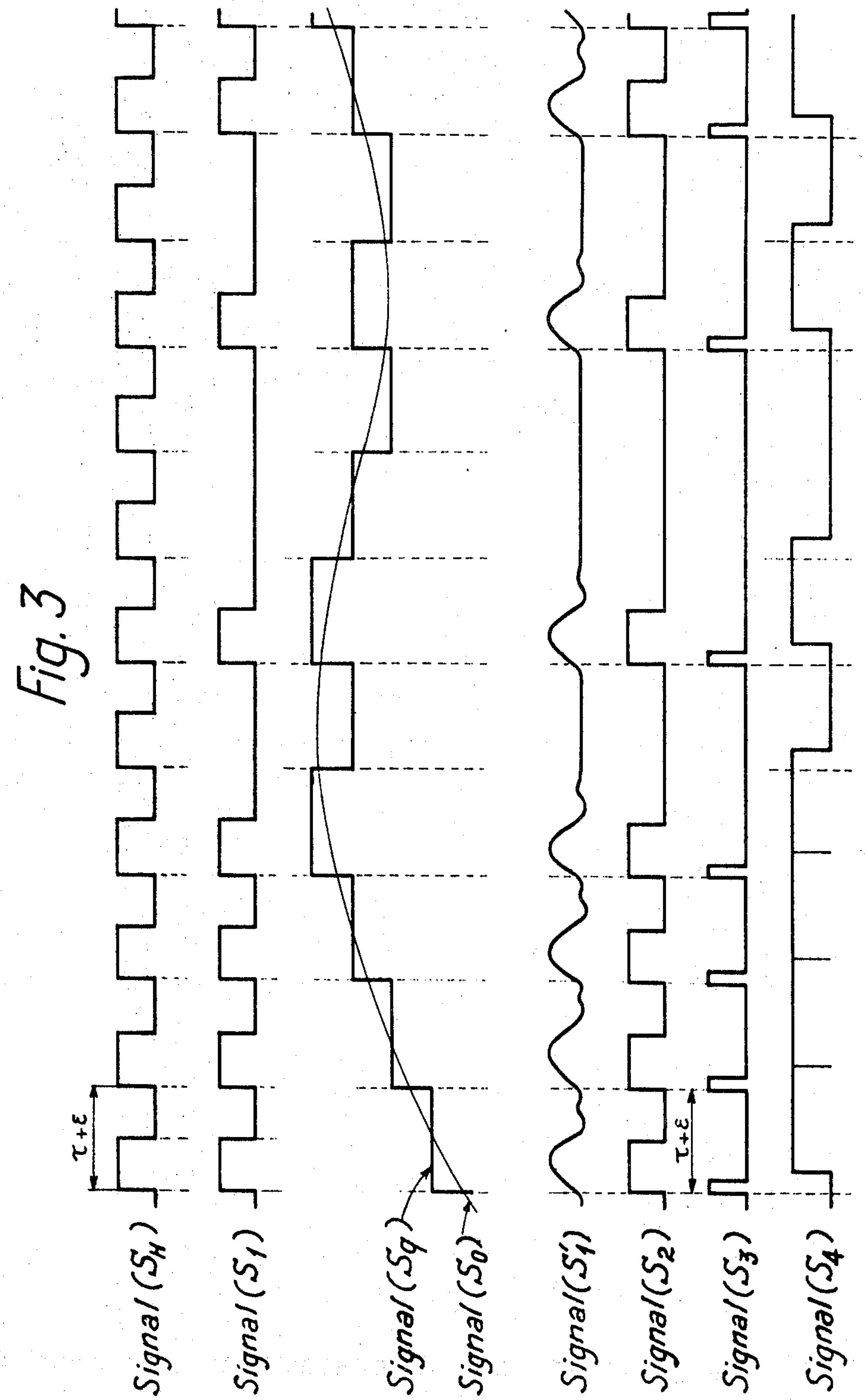
FIG. 3 shows diagrams of signals at different points of the subscriber's telephone set and of the pulse converter of the subscriber's equipment in the exchange.

FIG. 2 illustrates the circuit diagram of a telephone set 1, at least with respect to the part 100 relating to the elements of the delta modem equipment. The unit 10 connected to the modem part 100 comprises the conventional elements of standard telephone sets, that is to say the handset and its hook, the calling dial or keyboard, and the ringing mechanism. The signals $S_o$ (diagram $S_o$, FIG. 3) which issue from the terminal $10_1$ of the block 10, are voice frequency signals generated by the microphone of the telephone set. These signals $S_o$ act on the input of a comparator 101 connected in series with a modulator 102 which, from the timer 109, receives a train of square pulses SH (diagram SH, FIG. 3) of strictly defined period. This train of pulses SH is modulated by the modulator 102 by means of the signals issuing from the comparator 101. The modulator 102 delivers or fails to deliver pulses $S_1$ (diagram $S_1$, FIG. 3) in phase with the signals SH of the timer depending on the result of the comparison given by the comparator 101 between the voice frequency signal $S_o$ and the signal $S_q$ (diagram $S_q$, FIG. 3) which is the equivalent of the signal $S_o$ in quantified form and which is obtained by means of the integrator 103 from pulses $S_1$ issuing from the modulator 102. The pulses $S_1$ are transmitted to the exchange 2 through the amplifier 104, along the transmission line 111 and reach the exchange after distortion by transmission, in the form of the pulses $S'_1$ (FIG. 3).

The reception line 112 transmits, to the set 1, a train of modulated pulses $\Sigma_1$ caused by the conversation of the subscriber answering the subscriber at the set 1, and which is at the frequency of the exchange timer and not at the frequency of the subscriber's timer. After undergoing a definite degree of distortion, this train is regenerated by a device comprising the threshold or cutoff amplifier 105 followed by the monostable flip-flop 106. Upon issuing from the latter, the signal $\Sigma_1$ has its initial appearance (diagram $S_1$, FIG. 3) with the sole exception that it is strictly at the frequency of the exchange timer. It is passed, on the one hand to the demodulator 107, of similar structure to the integrator 103, and on the other hand to the timer 109 to synchronize the latter. A quantified signal $\Sigma_q$ appears from the outlet of the demodulator 107 and has the appearance of the signal $S_q$ of FIG. 3, with the exception that it is strictly at the frequency of the exchange timer. This signal, after traversing the low-pass filter 108, is smoothed so that upon issuing from the filter 108, a voice frequency signal $\Sigma_o$ is collected, which energizes the earphone of the set situated in the block 10.

The transformers 61 and 62 and 71 and 72, which have center tappings render it possible to supply the set 1 between the wires in parallel of the lines 111 and 112. The supply voltage +v. is available across the terminals of the Zener diode 63.

Figure 4:
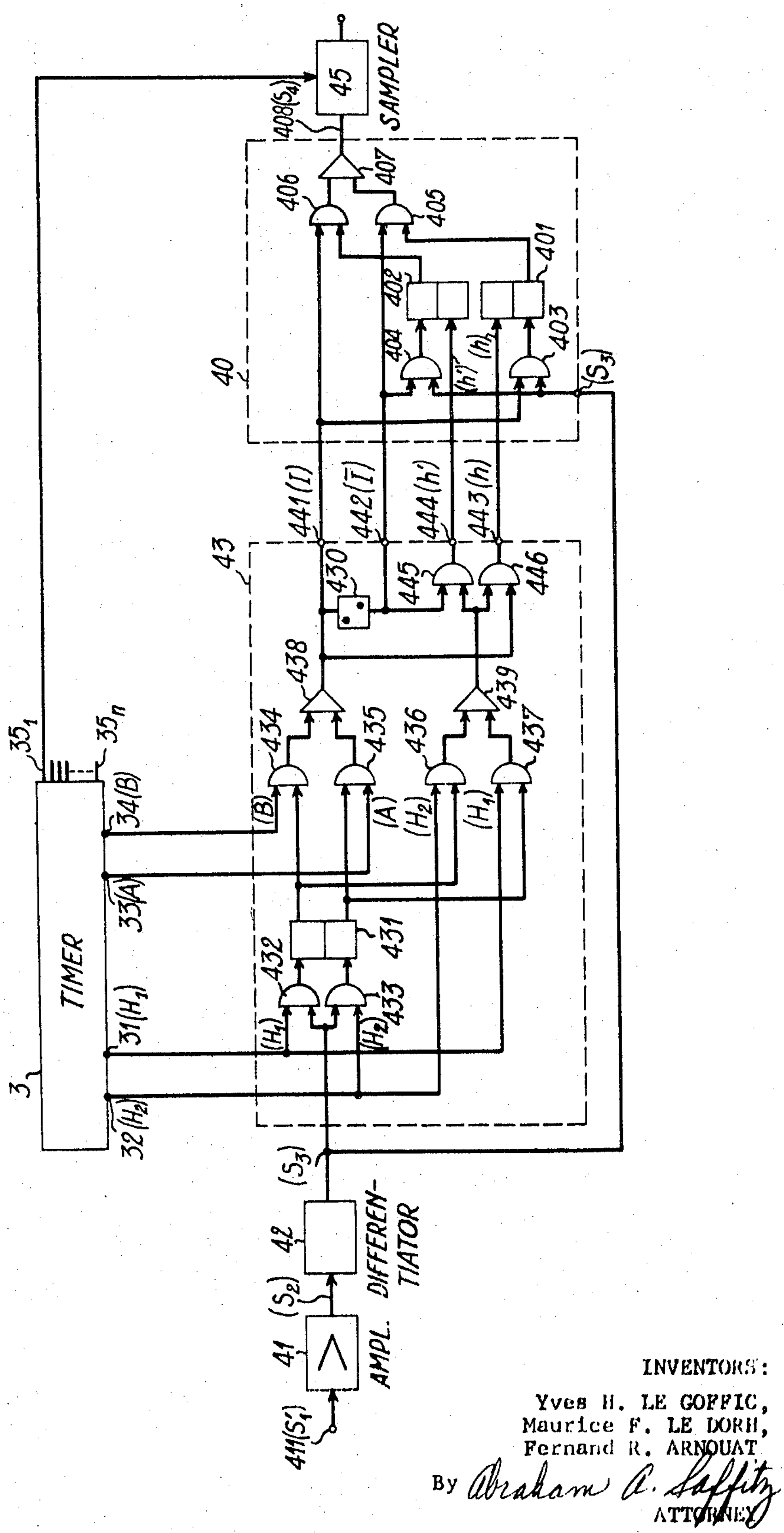
FIG. 4 shows the structure of the pulse conversion device of the subscriber's equipment.
Figure 5:
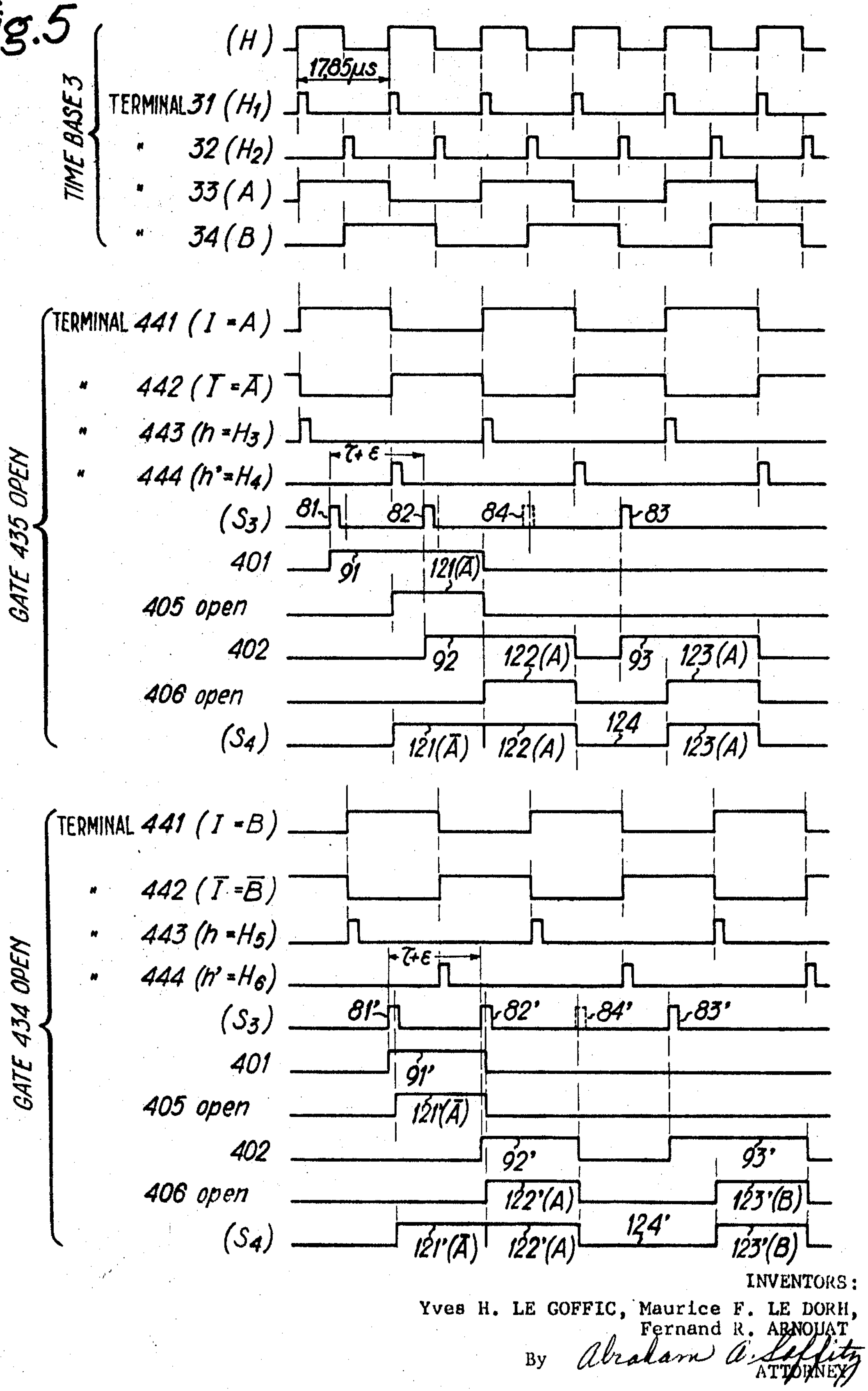
FIG. 5 illustrates diagrams of signals rendering it possible to explain the operation of the pulse converter.

FIG. 4 is a block diagram showing the structure of a pulse converter 4 (FIG. 1) coordinated with the subscriber's set 1. This pulse conversion device comprises five circuits 41, 42, 43, 40 and 45. The input terminal 411 of the converter 4 is connected to the end of the transmission line 111 of the set 1; it is thus acted upon by the signals $S'_1$, FIG. 3. These signals $S'_1$ are re-formed to shape (diagram $S_2$, FIG. 3) and converted into pulses $S_3$ (diagram $S_3$, FIG. 3) having a duration of 1 microsecond for example, by means of the threshold amplifier 41 and the differentiation circuit 42. Each pulse of the train $S_3$ is replaced by a pulse $S_4$ (diamgram $S_4$, FIG. 3) having a duration of 17.85 microseconds, if the frequency of the time base 3 of the exchange 2 is equal to 56 kilocycles. This pulse $S_4$ should be chosen as a function of the relative phase of the signal $S_3$ and of appropriate signals transmitted by the time base 3 and in general manner marking the onset, the middle and the end of the sampling periods. The elaboration of the signals $S_4$ is performed by the selection circuits 43 and 40. The time base 3 feeds the circuit 43 with four signals $H_1$, $H_2$, A and B, respectively through the terminals 31, 32, 33, 34. These signals have the following characteristics:

The signal $H_1$ is formed of a series of pulses of a duration of 0.5 microsecond in phase with the leading edges of the signal H of the time base 3 (diagram $H_1$, FIG. 5); the signal $H_2$ is formed by a series of pulses of a duration of 0.5 microsecond in phase with the trailing edges of the signal H (diagram $H_2$, FIG. 5); the signal A is a square signal in phase with the signal H, but at half the frequency (diagram A, FIG. 5); the signal B is a square signal displaced through a semiperiod relative to the signal H, but of half the frequency (diagram B, FIG. 5).

The circuit 43 comprises a flip-flop 431 set by means of the AND gates 432 and 433 by the coincidence of the signal $S_3$ with the signals $H_1$ and $H_2$. This flip-flop 431 controls the AND gates 434, 435, 436 and 437. Coincidence of the signals A or B and of the signals of the flip-flops 431 open AND gates 434 and 435. Coincidence of the signals $H_1$ or $H_2$ and of the signals of the flip-flop 431 open the AND gates 436 and 437. The signals issuing from the AND gates 434 and 435 pass through an OR gate 438 and the signals issuing from the AND gates 436 and 437 pass through an OR gate 439. Finally, the output of the gate 438 is connected direct to the AND gate 446, and through an inverter 430, to the AND gate 445. The output of 439 is connected to the input of both gates 445 and 446.

As is apparent from FIG. 5, the circuit 43 delivers two different sets of signals according to circumstances:

a. if the AND gates 435 and 437 are open: the signal I=A appears at the terminal 441, the complementary signal $\bar{I}=\bar{A}$ appears at the terminal 442, the signal $h=H_3$ in phase with the signal $H_1$ but at half the frequency, appears at the terminal 443, the signal $h'=H_4$ in phase with the signal $H_1$ but at half the frequency and displaced through a semiperiod relative to $H_3$, appears at the terminal 444.

b. If the AND gates 434 and 436 are open: the signal I=B appears at the terminal 441, the complementary signal $\bar{I}=\bar{B}$ appears at the terminal 442, the signal $h=H_5$ in phase with the signal $H_2$ but at half the frequency, appears at the terminal 443, the signal $h'=H_6$ in phase with the signal $H_2$ but at half the frequency and displaced through a semiperiod relative to $H_5$, appears at the terminal 444.

The circuit 40 of the converter comprises two flip-flops 401 and 402. The flip-flop is controlled by the signals $h=H_3$ of $H_5$, as well as by the signal $S_3$ in coincidence with the signals I=A or B, through the AND gate 403. The flip-flop 402 is controlled by the signals $h'=H_4$ or $H_6$, as well as by the signal $S_3$ in coincidence with the signals $I=\bar{A}$ or $\bar{B}$, through the AND gate 404. The signals issuing from the flip-flop 401 open the AND gate 405 if they are in coincidence with the signals $\bar{I}=\bar{A}$ or $\bar{B}$. The signals issuing from the flip-flop 402 open the AND gate 406 if they are in coincidence with the signals I=A or B.

Let us assume that a definite time after the synchronization of the subscriber's timer, the brief pulse 81 derived from the subscriber's code pulse is situated, as shown in FIG. 5, slightly in advance of the pulse $H_2$ marking the onset of the semiperiod of sampling, and that the flip-flop 431 remained in the condition which opens 435 and closes 434, that is to say that the signals I and $\bar{I}$ are A and $\bar{A}$ respectively, and that the signals $h$ and $h'$ are $H_3$ and $H_4$, respectively. The pulse 81 is initially converted into a long pulse 91 whereof the onset corresponds to the coincidence between 81 and A and the end corresponds to the subsequent pulse $H_3$, and then into the pulse 121 which is no other than the pulse $\bar{A}$ coinciding with 91. The pulse 82, spaced apart from 81 by $(\tau+\epsilon)$, does not as yet coincide with $H_2$. It is converted initially into a long pulse 92 whereof the onset corresponds to the coincidence between 82 and $\bar{A}$ and the end corresponds to the subsequent pulse $H_4$, then into the pulse 122 which is no other than the pulse A coinciding with 92. The pulse 83, spaced apart from 82 by $(2(\tau+)$, coincides with $H_2$. The flip-flop 431 is actuated, but this action confirms it in its prior state. The signals A, $\bar{A}$, $H_3$ and $H_4$ are not exchanged for the signals B, $\bar{B}$, $H_5$ and $H_6$ respectively. The pulse 83 is converted initially into a long pulse 93 which begins upon coincidence between 83 and $\bar{A}$ and ends with the subsequent pulse $H_4$, then into the pulse 123 which is no other than the pulse A coinciding with 93. The pulses 81, 82, 83 and 84 whose recurrence period if $(\tau+\epsilon)$ have thus been converted into pulses 121, 122, 123, 124, each having a duration $\tau$ and in phase with the exchange timer. The resulting pulse occupies the period of the exchange timer immediately following the period within which the brief pulse had appeared.

Let us now assume that a brief pulse 81′, following by a long time the last synchronization of the subscriber's timer, is situated, as shown in FIG. 5, a little in advance of the pulse $H_1$ and that the flip-flop 431 remained in the state in which gate 435 is open and gate 434 is closed, that is to say, that the signals I and $\bar{I}$ are A and $\bar{A}$ respectively and that the signals $h$ and $h'$ are $H_3$ and $H_4$ respectively. The pulse 81′ is converted initially into a long pulse 91′ whose onset corresponds to the coincidence between 81′ and A and whose end corresponds to the subsequent pulse $H_3$, then into the pulse 121′ which is no other than the pulse $\bar{A}$ coinciding with 91′. The pulse 82′ spaced apart from 81′ by $(\tau+\epsilon)$ does not coincide as yet with $H_1$. It is converted initially into a long pulse 92′ whose onset corresponds to the coincidence between 82′ and $\bar{A}$ and whose end corresponds to the subsequent pulse $H_4$, then into the pulse 122′ which is no other than the pulse A coinciding with 92′. The pulse 83′, spaced apart from 82′ by 2 $(\tau+\epsilon)$, coincides with $H_1$. The flip-flop 431 is actuated and its state changes. The signals A, $\bar{A}$, $H_3$ and $H_4$ are exchanged for the signals B, $\bar{B}$, $H_5$ and $H_6$. The pulse 83′ is converted initially into a long pulse 93′ which begins at the coincidence of 83′ and B and ends with the subsequent pulse $H_6$, then into the pulse 123′ which is no other than the pulse B coinciding with 93′.

The pulses 81′, 82′, 83′ and 84′ whose recurrence period is $(\tau+\epsilon$, have thus been converted into pulses 121′, 122′, 123′, and 124′, of which 121′, 122′, 123′ have the duration $\tau$, and 124′ has the duration $1.5\tau$. Depending on the location of the time slot for the subscriber considered, the pulse 124′ incurs the risk of being sampled twice, merely producing a single sampling error, the subsequent sampling being absolutely correct.

Figure 6:
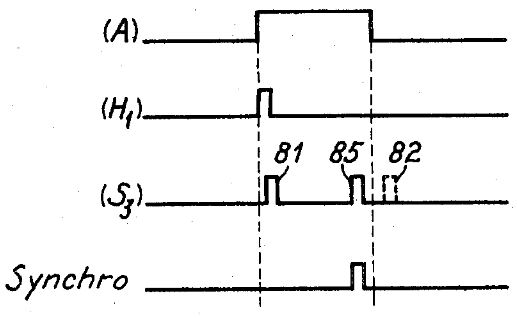
FIGS. 6, 7 and 8 are diagrams of signals also relating to the operation of the pulse converter.

The synchronization of the timer 109 has the result of momentarily reducing its period. FIG. 6 illustrates the case in which the pulse 81 of the signal $S_3$ is close to the pulse $H_1$ without being coincident with the same. It may occur that if the timer 109 has been left unsynchronized for a sufficiently long time, it may drift sufficiently for an eventual synchronization to cause the pulse which should have appeared at 82 without synchronization, to appear at 85. It is apparent that, in this case, no coincidence occurs between $H_1$ and the pulse 85, and a reconstitution failure would result if the signals A and $\bar{A}$ had been employed to reconstitute the signal. In reality however, the signals A and $\bar{A}$ cannot be employed to perform the reconstitution. In point of fact, since the synchronization has reduced the interval 81—82 to 81—85, the signal $S_3$ had drifted in continuous manner by a quantity equal to the interval 85—82 and this owing to the difference in frequency between $S_H$ and H. This difference always being in the same direction, the pulses preceding 81 were thus necessarily in coincidence with $H_1$ and the device 43 had already taken the decision to employ the signals B and $\bar{B}$ to perform the reconstitution. No reconstitution failure thus intervenes at the instant in which an eventual synchronization reduces the period of the timer 109.

To complement the above considerations, it is apt to examine at this time the precision which is acceptable in defining the stability of the timer 109 of the subscriber's set. This precision is given by the maximum drift tolerable on the signals $S_3$ and by the maximum time during which the telephone system can remain without synchronization. It has been observed from the above, that in the favorable case illustrated in FIG. 5 with the gate 435 open, a displacement close in magnitude to one period can be permitted. By contrast, in the unfavorable case in which the pulse $S_1$ sent out by the subscriber's set at the instant at which his timer 109 has been synchronized, is received at $S_3$ in phase with $H_1$ or $H_2$, the maximum permissible displacement amounts to no more that a semiperiod. In the case however, in which $S_3$ has been displaced by almost a semiperiod, this results in operation of the timer 109 as given by FIG. 7. In this FIG., the following are illustrated:

- the signal $S_H$ of the subscriber's set timer 109 whose frequency is lower than that of the exchange timer 3,
- the signal H of the timer 3 whose frequency being higher than that of the timer 109; it is apparent that at the end of a definite time, if no synchronization has occurred, the two timers 3 and 109 are practically in phase opposition,
- the signal which has passed through the exchange and is consequently in phase with the timer 3, and which serves the purpose of synchronizing the timer 109.

Figure 7:
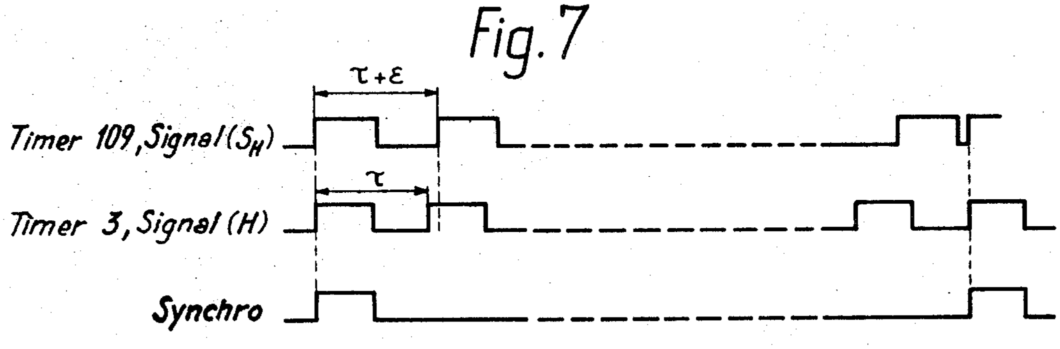
Figure 8:
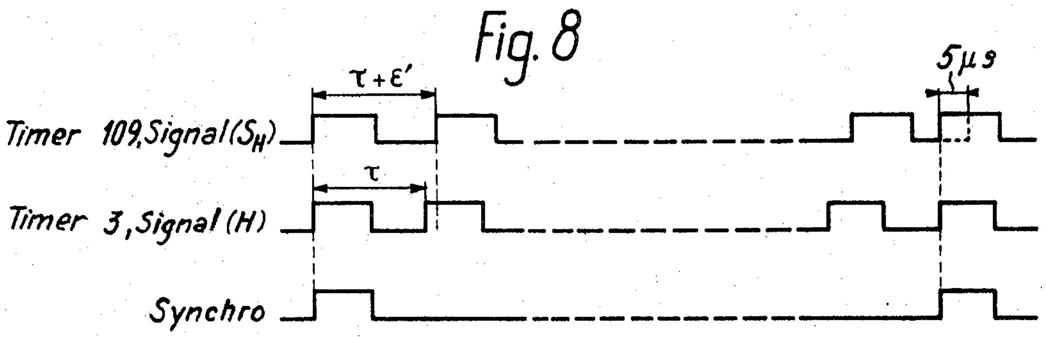

The case considered in FIG. 7 is that in which the signal employed for synchronization comprises too long a sequence of noughts and the following synchronization pulse arrives at a time at which the two timers 109 and 3 are practically in phase opposition; the result thereof is that the duration of a semialternation of the subscriber's set timer 109 is reduced almost to nought. In this case, the pulse transmissible over the lime has a very different duration from what it should be, and the transmission is made incorrectly on the line. In point of fact, this amounts to transmitting over the line, a signal of much higher frequency than 56 kHz. during the duration of a period. The attenuation of the transmission on the line is greater, and upon reception, the useful signal is difficult to extract from the noise accompanying the same. This fault is eliminated by reducing the maximum drift of the timer 109 to 5 microseconds, that is to say approximately one-third of a period instead of half a period, as illustrated in FIG. 8 in which the timers 3 and 109 are less dephased than in the case of FIG. 7, and the semialternation of the timer 109 is reduced much less by the synchronization pulse. The data which have passed through the exchange 2 are employed to synchronize the timer 109. During the conversation, during the instants of silence, the information transmitted is a series of ones and noughts which is the delta-code translation of a zero signal, and the timer 109 is thus synchronized frequently. By contrast, as soon as the voice frequency signals of the conversation appear, a long series of noughts can intervene, if these signals possess great amplitudes. In practice, it is accepted that delta modulation is appropriate for voice transmission, if the coder or modulator 102 can encode the maximum amplitude signal it is possible to have at the frequency of 800 Hz. At 800 Hz. however, the number of consecutive noughts which can occur amounts to approximately 30, when the coder 102 is saturated. Consequently, the timer 109 of the subscriber's set 1 can remain without synchronization during a time equal to that corresponding to 30 periods. The maximum permissible duration shift being 5 $\mu$s, the drift $\epsilon$ per period amounts 5/30 $\mu$s, and the relative drift is:

$$-\frac{\Delta F}{F}=\frac{\epsilon}{\tau}=\frac{5}{30\times 17.85}=0.95\ \%$$

The drift simultaneously contains the difference in nominal frequency and the instability. If the timer 109 of the subscriber's set has a rated frequency of 56 kHz.–0.5 percent and a stability of ±0.3 percent, in extreme cases, the difference in frequency between the timer 109 and the timer 3 can amount to:

$$56\left(1-\frac{0.5+0.3}{100}\right)=(56{,}000-448)\ \text{Hz}$$

$$56\left(1-\frac{0.5-0.3}{100}\right)=(56{,}000-112)\ \text{Hz}$$

These frequencies are lower than those of the timer 3, which allows of the synchronization of the timer 109. A period of $(\tau+\epsilon)$=18 $\mu$s corresponds to the frequency of (56,000–448) Hz. The difference in period between the two timers amounts to $\epsilon$=18–$a$17.85=0.15$\mu$s, which at the end of 30 periods amounts to 4.5 $\mu$s.

Figure 9:
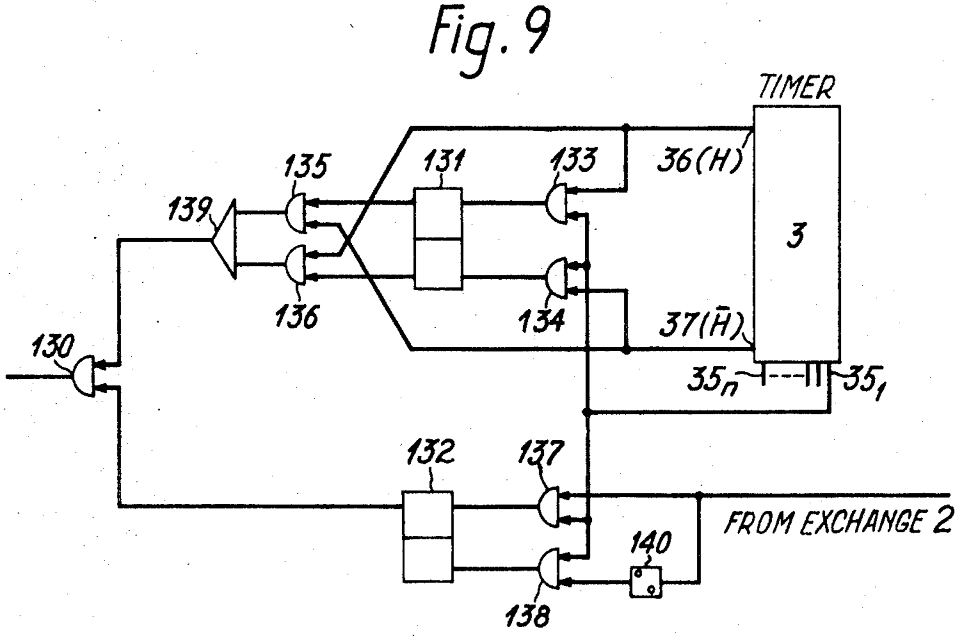
FIG. 9 shows the structure of the retransmission converter allocated to a subscriber's equipment in the exchange.

The retransmission pulse converter is illustrated in FIG. 9 and comprises two flip-flops 131 and 132, several AND gates 130 and 133—138, an OR gate 139, and an inverter 140. The subscriber's sampling time-slot supplied at one of the terminals $35_1$—$35_n$, $35_1$ for example, of the timer 3 is applied to the gates 133, 134, 137 and 138. The signal H (first line of FIG. 5) is applied from the terminal 36 of the timer 3 to the gates 133 and 136, and the signal $\overline{H}$ from the terminal 37 of the timer 3 to the gates 134 and 135. The signal coming from the exchange and coinciding with the subscriber's sampling slot is applied direct to the gate 137 and through the inverter 140 to the gate 138. The result is that if the signal coming from the exchange and coinciding with the sampling slot has the value one, the gate 137 opens, the flip-flop 132 is driven into the state one and prepares the opening of the gate 130. If the subscriber's slot falls within a signal H, the gate 133 opens, the flip-flop 131 is driven into the state one and the gate 135 opens and allows the signal $\overline{H}$ to pass. If the subscriber's slot falls within a signal $\overline{H}$, the gate 134 opens, the flip-flop 131 is driven into the state zero and the gate 136 opens and allows the signal H to pass. It is thus apparent that, each time the subscriber's retransmission equipment receives a one from the exchange, a signal in phase with the timer of the exchange is transmitted to the subscriber. This signal is in phase $\overline{H}$ if the sampling slot $35_n$ allocated to the subscriber falls within the first part of the sampling period; by contrast, it is in phase with H if the sampling slot falls within the second part of the sampling period.

We claim:

1. A telephone switching system employing delta modulation comprising a time-division switching network and a plurality of subscriber's telephone sets, each subscriber's set comprising a delta modulator for converting analog signals produced by said telephone set into delta-coded pulses, a delta demodulator for converting delta-coded pulses coming from said switching network into analog signals applied to said telephone set, a timer and means for synchronizing said timer by said delta demodulator and, in the time-division switching, network a timer defining sampling periods, a plurality of subscriber's equipments, each subscriber's equipment comprising means for receiving delta-coded signals from said telephone subscriber's set, a pulse converter and stretcher converting each delta-coded pulse received from a subscriber's set into a long pulse of the same binary value, having a duration equal to one sampling period and coincident with the full sampling period just following said delta-coded pulse occurrence time, means for sampling said long pulse during the time slots allocated to the subscribers and comprised within said sampling period, and means for transmitting delta-coded signals to said telephone subscriber's sets.

2. A telephone switching system employing delta-modulation comprising a time-division switching network and a plurality of subscriber's telephone sets, each subscriber's set comprising a delta modulator for converting analog signals into delta-coded pulses forming a train of square pulses, a delta demodulator for converting delta-coded pulses forming a train of square pulses coming from said switching network into analog signals applied to said telephone set, a timer having a given frequency and means for synchronizing said timer by said delta demodulator and, in the time-division switching network, a timer defining sampling periods and having a frequency higher than the subscriber's set timer frequency, a plurality of subscriber's equipments, each subscriber's equipment comprising means for receiving delta-coded signals from said telephone subscriber's sets, a pulse converter and stretcher converting each delta-coded pulse into an internally generated brief pulse occupying a variable position within the sampling period, and each brief pulse into a long pulse of the same binary value, having duration equal to the sampling period and coincident with the full sampling period just following said brief pulse occurrence time and means for sampling said long pulse during the time slots allocated to the subscribers and comprised within said sampling period and means for transmitting delta-coded signals in phase with the switching network timer to said telephone subscriber's sets.

3. A telephone switching system employing delta modulation comprising a time-division switching network and a plurality of subscriber's telephone sets, each subscriber's set comprising a delta modulator for converting analog signals into delta-coded pulses forming a train of square pulses, a delta demodulator for converting delta-coded pulses forming a train of square pulses coming from said switching network into analog signals applied to said telephone set, a timer having a given frequency and means for synchronizing said timer by said delta demodulator and, in the time-division switching network, a timer having a frequency higher than the subscriber's set timer frequency and defining sampling periods and periods in phase quadrature with said sampling periods, a plurality of subscriber's equipments, each subscriber's equipment comprising means for receiving delta-coded signals from said telephone subscriber's sets, a pulse converter and stretcher converting each delta-coded pulse into an internally generated brief pulse occupying a variable position within a given sampling period, and selectively converting each brief pulse into a long pulse of the same binary value, having a duration equal to the sampling period and coincident with the full sampling period just following said brief pulse occurrence time when said occurrence time falls within the said given sampling period and into a longer pulse of the same binary value, having a duration equal to one time and a half the sampling period and coincident with half the sampling period plus the whole period in phase quadrature with the latter sampling period just following said brief pulse occurrence time when said occurrence time coincides with the end of said given sampling period, and means for sampling said long and longer pulse during the time slots allocated to the subscribers and comprised within said sampling period and means for transmitting delta-coded signals in phase with the switching network timer to said telephone subscriber's sets.